No. 706,683. Patented Aug. 12, 1902.
C. P. NILES.
FIELD GATE.
(Application filed Dec. 30, 1901.)
(No Model.)
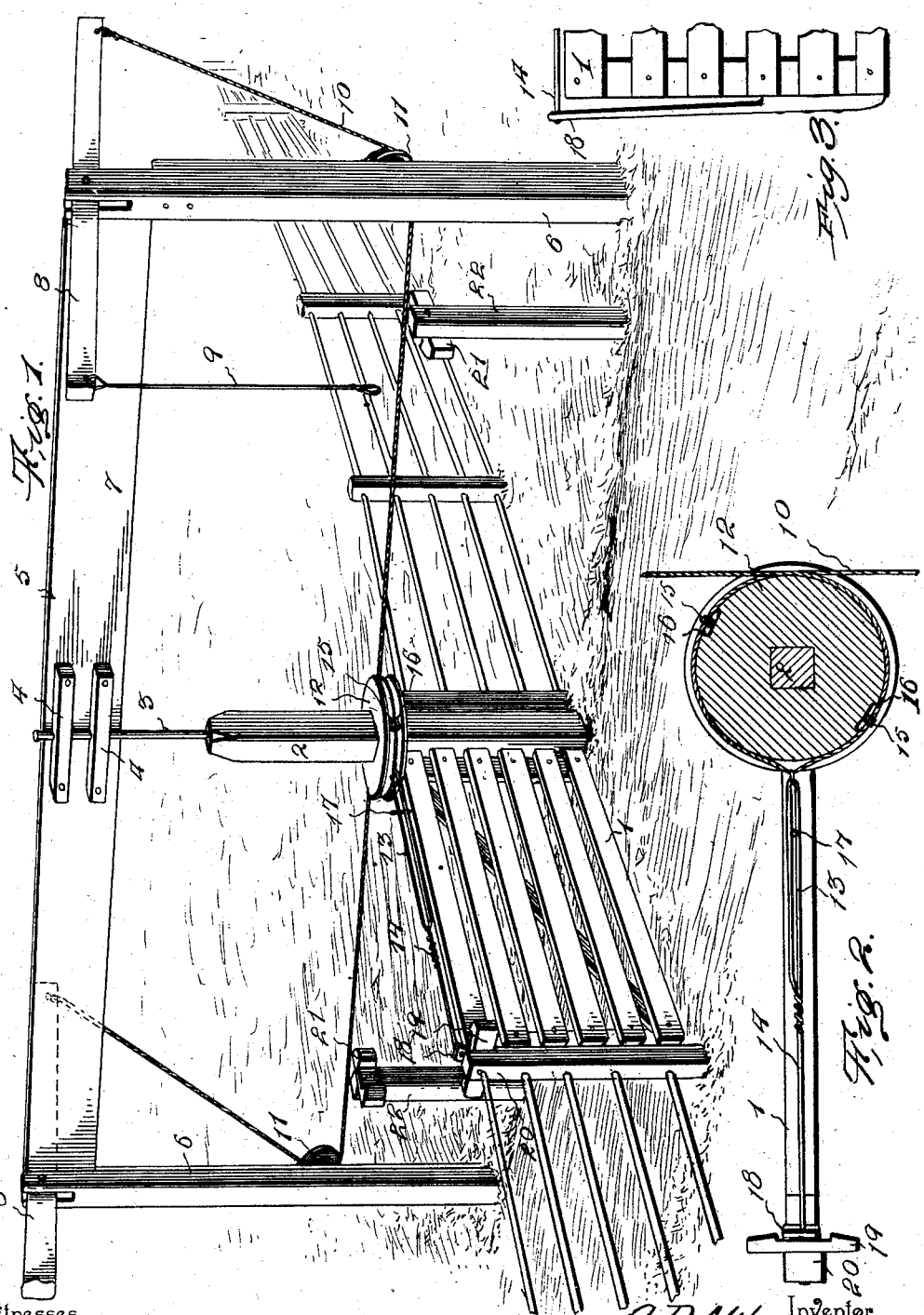
Witnesses
Inventor
C. P. Niles
by
C. A. Snow & Co.
Attorneys

UNITED STATES PATENT OFFICE.

CLEVLAND P. NILES, OF CHINOOK, MONTANA.

FIELD-GATE.

SPECIFICATION forming part of Letters Patent No. 706,683, dated August 12, 1902.

Application filed December 30, 1901. Serial No. 87,796. (No model.)

*To all whom it may concern:*

Be it known that I, CLEVLAND P. NILES, a citizen of the United States, residing at Chinook, in the county of Choteau and State of Montana, have invented a new and useful Field-Gate, of which the following is a specification.

The invention relates to improvements in gates.

The object of the present invention is to improve the construction of swinging gates, more especially the means for operating the same and for controlling the latch and to provide a simple and comparatively inexpensive construction capable of enabling a gate to be opened and closed at a distance from either side of it and adapted to cause the gate to swing away from the operator in opening, whereby the gate is prevented from striking an animal.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention. Fig. 2 is a horizontal sectional view illustrating the arrangement of the operating cords or ropes. Fig. 3 is a detail view illustrating the construction of the latch.

Like numerals of reference designate corresponding parts in all the figures of the drawings.

1 designates a swinging gate which may be constructed in any desired manner and which is provided at its inner or rear end with an upright 2, having upper and lower journals arranged in suitable bearings. The lower journal is stepped in a suitable socket or bearing at the bottom of the gate, and the upper journal 3, which may consist of a rod, extends to central bearings 4 of a frame 5. The frame 5 consists of uprights 6 and a top connecting-piece 7, which extends a suitable distance beyond the gate at each side thereof. The uprights are bifurcated at their upper ends to receive operating-levers 8, disposed transversely of the roadway and provided at their front ends with depending handle-ropes 9, having suitable grips or handles at their lower ends; but rods or any other suitable devices may be employed for this purpose.

The rear ends of the operating-levers are connected to the outer ends of operating cords or ropes 10, which extend downward to suitable guides 11, mounted on the uprights substantially in the same plane as the top of the gate. The said cords or ropes 10 extend from the guides 11 to the gate and cross each other at the back of a horizontal disk or plate 12 and extend around the opposite sides thereof to the front of the same, the disk or plate being provided with a peripheral groove to receive the cords or ropes. The front terminals of the cords or ropes are connected with a loop 13 of a connecting wire or rod 14 and are provided with stops 15, consisting, preferably, of knots or buttons arranged in opposite recesses 16 of the disk or plate and adapted to allow a limited movement of the cords or ropes independently of the disk or plate to enable the said cords or ropes to operate the latch and to relieve the latter of excessive strain. The operating ropes or cords may consist of a single continuous cord. The loop 13, which is oblong, is composed of two parallel sides arranged at opposite sides of a projection or finger 17 of the gate, which prevents any lateral movement of the loop sufficient to interfere with the operation of the latch. The connecting rod or wire 14 is secured to the upper end of the latch, which consists of an upright spring secured to the front of the gate and extending above the same. The lower end of the latch 18 is enlarged to offset its upper portion from the front bar of the gate, and the upper portion of the latch is adapted to engage a keeper 19 of a main latch-post 20 and supplemental keepers 21 of auxiliary latch-posts 22. The supplemental or auxiliary latch-posts 22 are located between the uprights and the gate, and their keepers are adapted to be engaged by the gate when the latter is open.

The operating-levers are oscillated in opposite directions, and when one of them is drawn downward to open the gate the other is swung upward by its operating cord or rope, and after the operator has passed through the gateway the elevated operating-lever is swung downward to close the gate.

The upright 2 of the gate is extended above the latter and is rectangular in cross-section, and the disk or plate is provided with a rectangular opening to receive the upright or bar 2 and is rigid with the same.

It will be seen that the gate is simple and comparatively inexpensive in construction, that it is adapted to be readily operated at a distance from either side of it, and that it will swing in either direction and always open away from the operator.

What I claim is—

1. The combination of a swinging gate provided with a latch, a projection or finger extending from the gate, a connecting device extending from the latch and having a loop receiving the finger, a disk or plate connected with the gate, and operating cords or ropes arranged on the disk or plate and connected with the loop, substantially as described.

2. The combination of a swinging gate having a latch and provided with a finger projecting upward from its upper edge, a connecting-rod extending along the top of the gate from the latch and provided with an oblong loop arranged at the rear portion of the gate and receiving the finger, a disk or plate mounted on the gate in rear of the loop, operating cords or ropes arranged on the disk or plate and connected with the loop, and means for limiting the movement of the cords or ropes independently of the disk or plate, substantially as described.

3. The combination of a swinging gate having a latch, a disk or plate mounted on the gate and provided at opposite sides thereof with recesses, operating cords or ropes extending around the disk or plate and capable of movement independently thereof, and provided with stops extending into the said recesses and adapted to engage the end walls thereof, means for connecting the operating cords or ropes with the latch, and means for actuating the cords or ropes, substantially as described.

In testimony that I claim the foregoing as my own I have hereto affixed my signature in the presence of two witnesses.

CLEVLAND P. NILES.

Witnesses:
W. B. SANDS,
EDWD. A. MARRIOTT.